United States Patent
Kim et al.

(10) Patent No.: US 10,648,421 B2
(45) Date of Patent: May 12, 2020

(54) SYSTEM AND METHOD FOR CONTROLLING FUEL INJECTION IN FLEX-FUEL VEHICLE

(71) Applicant: HYUNDAI AUTRON CO., LTD., Seoul (KR)

(72) Inventors: Youngjin Kim, Seoul (KR); Dongha Kim, Uiwang-si (KR)

(73) Assignee: HYUNDAI AUTRON CO., LTD., Seoul (KR)

(*) Notice: Subject to any disclaimer, the term of this patent is extended or adjusted under 35 U.S.C. 154(b) by 41 days.

(21) Appl. No.: 16/203,421

(22) Filed: Nov. 28, 2018

(65) Prior Publication Data

US 2019/0178194 A1 Jun. 13, 2019

(30) Foreign Application Priority Data

Dec. 13, 2017 (KR) ........................ 10-2017-0171085

(51) Int. Cl.
*F02D 41/00* (2006.01)
*F02D 41/30* (2006.01)
(Continued)

(52) U.S. Cl.
CPC ....... *F02D 41/3005* (2013.01); *F02D 19/061* (2013.01); *F02D 19/0686* (2013.01);
(Continued)

(58) Field of Classification Search
CPC .. F02D 19/061; F02D 19/0686; F02D 19/084; F02D 19/087; F02D 19/085;
(Continued)

(56) References Cited

U.S. PATENT DOCUMENTS 5,325,836 A   7/1994 Orzel et al.
5,762,046 A * 6/1998 Holmes ............... F02D 41/3082
                                                        123/497

(Continued)

FOREIGN PATENT DOCUMENTS

JP   2008-082329 A   4/2008
JP   2009-180230 A   8/2009

(Continued)

*Primary Examiner* — Audrey K Bradley
*Assistant Examiner* — Dapinder Singh
(74) *Attorney, Agent, or Firm* — Morgan, Lewis & Bockius LLP

(57) ABSTRACT

Disclosed are a method and system for controlling fuel injection in response to a change in the content of ethanol in a FFV having oxygen sensors and an ethanol sensor. The system includes an ethanol content change detection unit configured to detect a change in the content of ethanol, a flow rate calculation unit configured to calculate a volumetric flow rate of blending fuel and to integrate the calculated value, a condition determination unit configured to determine whether the change in the content of ethanol satisfies a condition for applying a fuel injection correction value, a control execution determination unit configured to determine whether to apply the fuel injection correction value by comparing the volumetric flow rate integration value with a preset second reference value, and a controller configured to determine a fuel injection correction value and to adjust an amount of fuel injection.

14 Claims, 6 Drawing Sheets

(51) Int. Cl.
  *F02D 19/06*    (2006.01)
  *F02D 19/08*    (2006.01)
  *F02D 41/14*    (2006.01)

(52) U.S. Cl.
  CPC ....... *F02D 19/084* (2013.01); *F02D 41/0025* (2013.01); *F02D 19/087* (2013.01); *F02D 41/1441* (2013.01); *F02D 2200/0611* (2013.01)

(58) Field of Classification Search
  CPC ............ F02D 41/3005; F02D 41/0025; F02D 41/1441; F02D 2200/0611
  USPC .......................................... 60/274, 285, 286
  See application file for complete search history.

(56) References Cited

U.S. PATENT DOCUMENTS

| | | | | |
|---|---|---|---|---|
| 5,934,255 | A * | 8/1999 | Dalton | ................ F02D 41/0025 123/1 A |
| 7,349,790 | B2 * | 3/2008 | Sremac | ................ F02D 19/066 123/478 |

FOREIGN PATENT DOCUMENTS

| | | |
|---|---|---|
| JP | 2010-151149 A | 7/2010 |
| JP | 2014-231819 A | 12/2014 |
| KR | 10-2013-0060565 A | 6/2013 |

\* cited by examiner

SYSTEM AND METHOD FOR CONTROLLING FUEL INJECTION IN FLEX-FUEL VEHICLE

CROSS REFERENCE TO RELATED APPLICATION

The present application claims the benefit of Korean Patent Application No. 10-2017-0171085 filed in the Korean Intellectual Property Office on Dec. 13, 2017, the entire contents of which are incorporated herein by reference.

BACKGROUND OF THE INVENTION

1. Technical Field

The present invention relates to a system and method for controlling fuel injection and, more particularly, to a system and method for controlling fuel injection in a flex-fuel vehicle (FFV) which uses blending fuel containing a given amount of ethanol as fuel and includes an ethanol sensor for detecting a change in the content of ethanol included in fuel.

2. Description of the Related Art

Environment regulations are recently reinforced in each country due to the acceleration of environmental pollution. The development of environment-friendly vehicles and the supply of alternative fuel are expanded. In particular, in Brazil and North America areas, a policy for spreading bio ethanol as alternative fuel in order to reduce the amount of oil used and to cultivate agriculture is carried out. Accordingly, an interest in a flex-fuel vehicle (FFV) using blending fuel (gasoline+bio ethanol) is rapidly increasing.

For example, an interest in the FFV is increasing to the extent that gasoline fuel for vehicles with which up to a maximum of 15% of ethanol has been mixed is sold in U.S.A and 80% or more of a total of the sales volume of all passenger cars is occupied by the FFV in Brazil in 2017.

Bio ethanol estimated as new renewable energy has an advantage in that it can reduce the generation of a toxic substance within waste gas. Furthermore, bio ethanol can reduce an ozone phenomenon due to low carbon emissions. In particular, bio ethanol extracted from a plant has advantages in that total carbon emissions are neutral due to carbon assimilation and durability is high because bio ethanol can be produced through the cultivation of agriculture.

The FFV can burn gasoline/ethanol blending fuel the same engine as described above. An air fuel ratio of gasoline is 14.7, whereas an air fuel ratio of ethanol is 9. An octane number of gasoline is 92, whereas an octane number of ethanol is 111. Accordingly, it is very important to check accurate content of ethanol within blending fuel because gasoline and ethanol are different in major characteristics as described above.

The reason for this is that if the ethanol content of blending fuel is checked to be lower than actual content, it is inefficient because spark advance available in ethanol is not sufficiently used and if the ethanol content of blending fuel is checked to be higher than actual content, engine damage may be caused because knocking, preignition, etc. occurs due to excessive spark advance.

Accordingly, a conventional FFV uses a method of training ethanol content using a feedback value of an oxygen sensor by considering that gasoline and ethanol have different air fuel ratios (i.e., gasoline 14.7 and ethanol 9). That is, a conventional blending fuel system trains ethanol content through an air fuel ratio error detected by the oxygen sensor when the ethanol content of fuel changes, and uses the trained ethanol content for fuel injection control.

More specifically, the conventional blending fuel system performs fuel quantity control based on ethanol content trained through an error of an air fuel ratio detected by the oxygen sensor. If there is a difference between the training value and an actual value, a signal deviation occurs in the oxygen sensor. Accordingly, the system controls an air fuel ratio feedback control value attributable to a fuel content deviation to disappear by increasing or decreasing a current ethanol content training value in response to a signal value of the oxygen sensor.

The method using the oxygen sensor as described above has an advantage in that a separate part is not necessary compared to the gasoline system. However, the method has disadvantages in that it requires a long time for ethanol content training (approximately 300~800 seconds) and is vulnerable to the noise and aging of the sensor and content training is difficult in the state in which the oxygen sensor has not been activated like at the early stage of startup and in an engine high load area in which a training error greatly occurs.

Accordingly, immediate and accurate ethanol content training is impossible. As a result, fuel injection control capable of implementing the best combustion in response to a change of ethanol content is difficult. In the case of a high efficiency engine having high combustion pressure, such as a turbo gasoline direct injection (GDI) engine, a method using an ethanol sensor capable of directly measuring ethanol content within fuel has emerged.

In a technology using an ethanol sensor, ethanol content within fuel that passes through the sensor is checked in real time based on the fact that gasoline and ethanol have different electrical characteristics (e.g., dielectric constants). The technology has an advantage in that accurate and fast control can be performed compared to a previous technology for training the content of ethanol based on a value detected by the oxygen sensor because an injection correction value is calculated based on an ethanol sensor value and immediately used for feedforward.

In the technology using an ethanol sensor, in general, the ethanol sensor is positioned in the middle of a fuel rail (refer to FIG. 1). For this reason, a point of time at which an ethanol content value is detected and a point of time at which the detected content value is incorporated into actual injection are inevitably different depending on the position where the ethanol sensor is positioned. As a result, there are problems in that an unwanted error occurs when feedforward is performed due to a difference between the points of time and combustion stability is deteriorated.

PRIOR ART DOCUMENT

Patent Document (Patent Document 0001) Korean Patent Application Publication No. 2013-0060565 (Jun. 10, 2013)

SUMMARY OF THE INVENTION

An object of the present invention is to provide a system and method for controlling fuel injection in a flex-fuel vehicle (FFV), which can minimize the occurrence of an error of a fuel quantity control value and maximize combustion stability through feedforward in which an ethanol content change section between a point of time at which a change in the content of ethanol is detected and a point of time at which the detected content change is incorporated into actual injection has been considered.

In accordance with an aspect of the present invention, there is provided a system for controlling fuel injection in response to a change in the content of ethanol in a flex-fuel vehicle (FFV) having oxygen sensors and an ethanol sensor for measuring ethanol content of blending fuel. The system includes an ethanol content change detection unit configured to detect a change in the content of ethanol within blending fuel based on a change in a measured value of the ethanol sensor, a flow rate calculation unit configured to calculate a volumetric flow rate of blending fuel injected into a cylinder and to integrate the calculated value when a change in the content of ethanol within the blending fuel is detected by the ethanol content change detection unit, a condition determination unit configured to determine whether the change in the content of ethanol detected by the ethanol content change detection unit satisfies a condition for applying a fuel injection correction value, a control execution determination unit configured to determine whether to apply the fuel injection correction value by comparing the volumetric flow rate integration value of the flow rate calculation unit with a preset second reference value when the condition for applying the fuel injection correction value is satisfied, and a controller configured to determine a fuel injection correction value corresponding to a change in the content of ethanol and to adjust an amount of fuel injection by incorporating the determined fuel injection correction value.

In this case, the condition determination unit may determine the condition to be satisfied when the change in the content of ethanol exceeds a first reference value stored in memory.

Furthermore, the flow rate calculation unit may include a process of calculating the volumetric flow rate injected into the cylinder based on information necessary to calculate a volumetric flow rate of blending fuel provided by a sensor positioned in each part of a vehicle and integrating the calculated values.

In this case, the information necessary to calculate the volumetric flow rate of the blending fuel may include some or all of an injection temperature, injection pressure, a difference in a pressure between the cylinder and a fuel line, and an opening time of an injector.

Furthermore, when the volumetric flow rate integration value is equal to or smaller than the second reference value stored in memory, the control execution determination unit may determine that fuel including changed ethanol content has not yet been incorporated into actual fuel injection, and may repeat a process of integrating the calculated volumetric flow rate value with a previous value. When the volumetric flow rate integration value exceeds the second reference value, the control execution determination unit may determine that fuel including changed ethanol content has been incorporated into actual fuel injection, and may generate a control execution signal for applying the fuel injection correction value.

In this case, the second reference value may include the results derived through calculation using a fuel line volume, line pressure, and a temperature in the content change modeling section, defined as a section from a point at which the ethanol sensor is positioned to a point at which blending fuel is injected, as variables or the results derived through simulation experiments or previous simulations.

Furthermore, the fuel injection correction value may be derived through a fuel injection map in which fuel injection data for each change section according to ethanol content and a coolant temperature change has been stored.

In accordance with another aspect of the present invention, there is provided a method of controlling fuel injection in response to a change in the content of ethanol in a flex-fuel vehicle (FFV) having oxygen sensors and an ethanol sensor for measuring ethanol content of blending fuel. The method includes a first step of detecting a change in the content of ethanol within blending fuel based on a change in a measured value of the ethanol sensor, a second step of calculating a volumetric flow rate of blending fuel injected into a cylinder and integrating the calculated value when a change in the content of ethanol within the blending fuel is detected in the first step, a third step of determining whether the change in the content of ethanol detected in the first step satisfies a condition for applying a fuel injection correction value, a fourth step of determining whether to apply the fuel injection correction value by comparing the volumetric flow rate integration value in the second step with a preset second reference value when the condition for applying the fuel injection correction value is satisfied in the third step, and a fifth step of determining a fuel injection correction value corresponding to a change in the content of ethanol if it is determined that the fuel injection correction value needs to be applied in the fourth step and adjusting an amount of fuel injection by incorporating the determined fuel injection correction value.

In this case, the second step may include a process of calculating the volumetric flow rate injected into the cylinder based on information necessary to calculate a volumetric flow rate of blending fuel provided by a sensor positioned in each part of a vehicle, and integrating the calculated values.

In this case, the information necessary to calculate the volumetric flow rate of the blending fuel may include some or all of an injection temperature, injection pressure, a difference in a pressure between the cylinder and a fuel line, and an opening time of an injector.

Furthermore, the third step may include determining the condition to be satisfied when the change in the content of ethanol exceeds a first reference value stored in memory.

Furthermore, in the fourth step, when the volumetric flow rate integration value is equal to or smaller than the second reference value stored in memory, fuel including changed ethanol content may be determined to have not yet been incorporated into actual fuel injection and a process of integrating the calculated volumetric flow rate value with a previous value may be repeated, and when the volumetric flow rate integration value exceeds the second reference value, fuel including changed ethanol content may be determined to have been incorporated into actual fuel injection and a control execution signal for applying the fuel injection correction value may be generated.

In this case, the second reference value may include results derived through calculation using a fuel line volume, line pressure, and a temperature in the content change modeling section, defined as a section from a point at which the ethanol sensor is positioned to a point at which blending fuel is injected, as variables or results derived through simulation experiments or previous simulations.

Furthermore, the fuel injection correction value may have been derived through a fuel injection map in which fuel injection data for each change section according to ethanol content and a coolant temperature change has been stored. A continuous model for an experimentally derived excess section may be applied to the injection correction value.

DESCRIPTION OF REFERENCE NUMERALS

Figure 1:
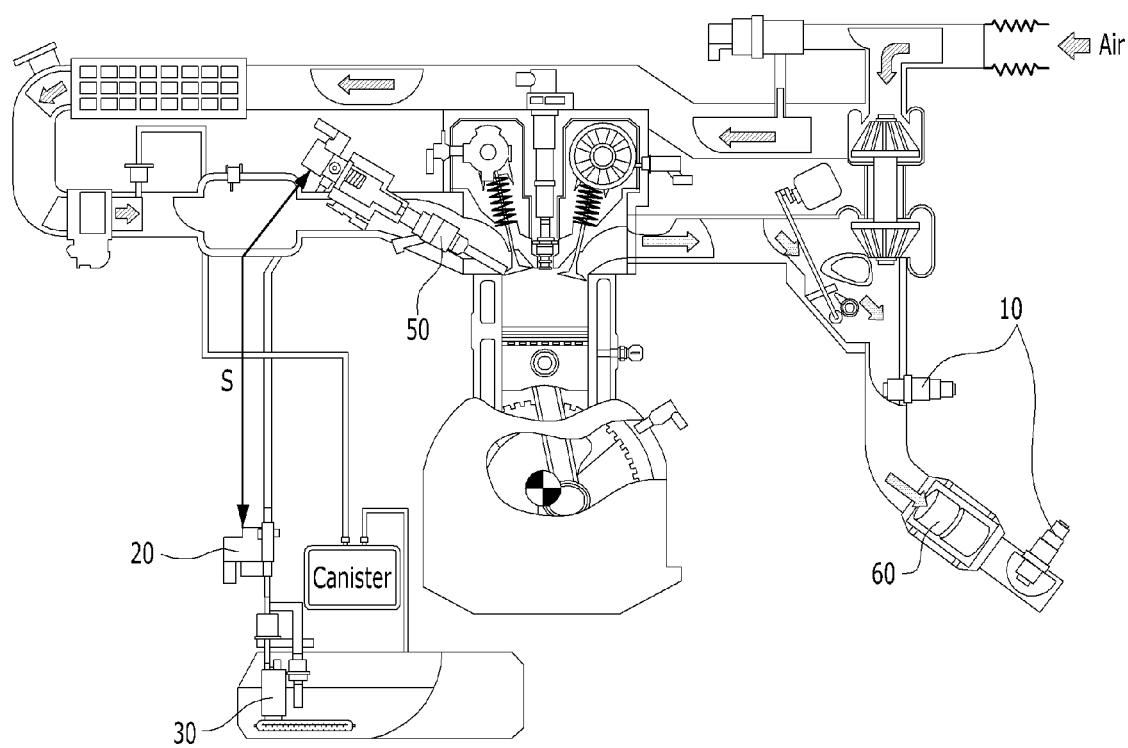
FIG. 1 shows a system configuration of the fuel injection system of a flex-fuel vehicle (FFV) according to an aspect of the present invention.

10: oxygen sensor
20: ethanol sensor
30: fuel pump
50: injector
60: catalyst unit

DETAILED DESCRIPTION

Hereinafter, embodiments of the present invention are described in detail with reference to the accompanying drawings.

In describing the present invention, terms used in this specification are merely used to describe a specific embodiment and are not intended to limit the present invention. An expression of the singular number includes a plurality of expressions unless clearly defined otherwise in the context.

Furthermore, it may be understood that a term, such as "include", "comprise" or "have", indicates the presence of a characteristic, number, step, operation, element, part or a combination of them described in the specification, and does not exclude the presence or addition possibility of one or more other characteristics, numbers, steps, operations, elements, parts or combinations of them in advance.

Furthermore, terms, such as the first and the second, may be used to describe various elements, but the elements should not be restricted by the terms. The terms are used to only distinguish between one element and the other element.

In addition, a term, such as " . . . unit", " . . . part" or " . . . module" described in the specification, means a unit for processing at least one function or operation, and this may be implemented by hardware or software or a combination of them.

Furthermore, in describing the present invention with reference to the accompanying drawings, the same element is assigned the same reference numeral, and a redundant description of the same element is omitted. Furthermore, in describing the present invention, a detailed description of a related known technology will be omitted if it is deemed to make the gist of the present invention unnecessarily vague.

Figure 2:
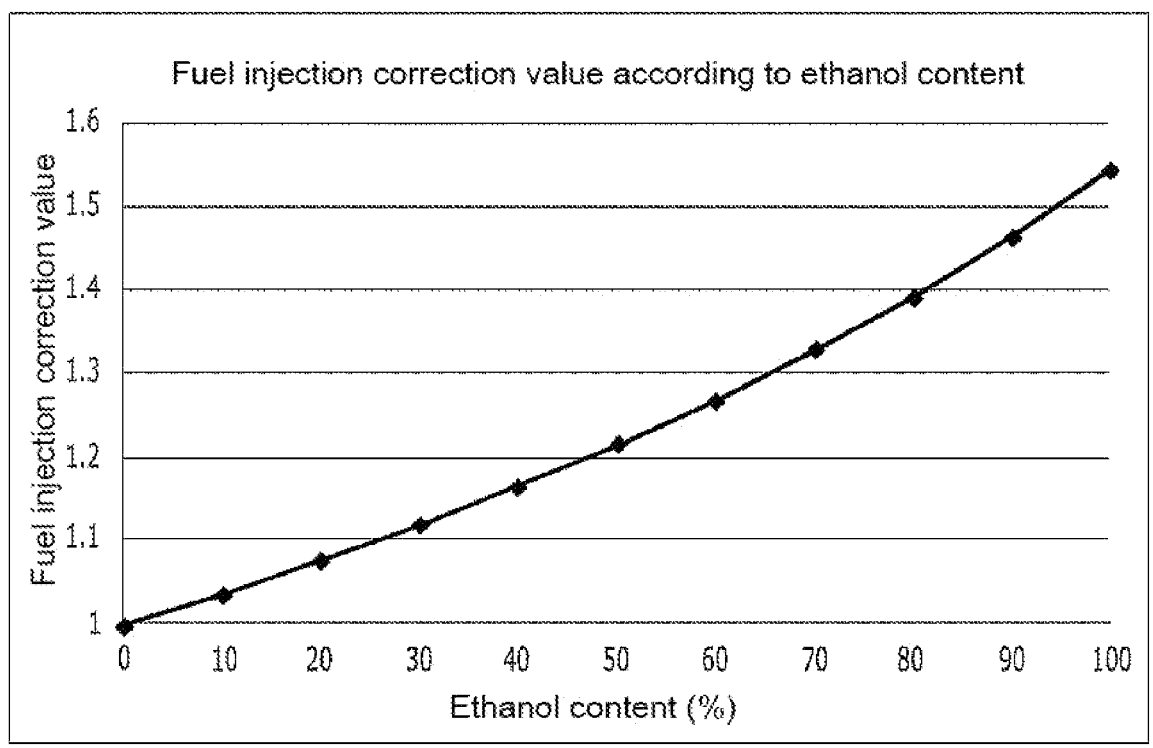
FIG. 2 is a graph showing a change in the fuel injection correction value according to a change of ethanol content.
Figure 3:
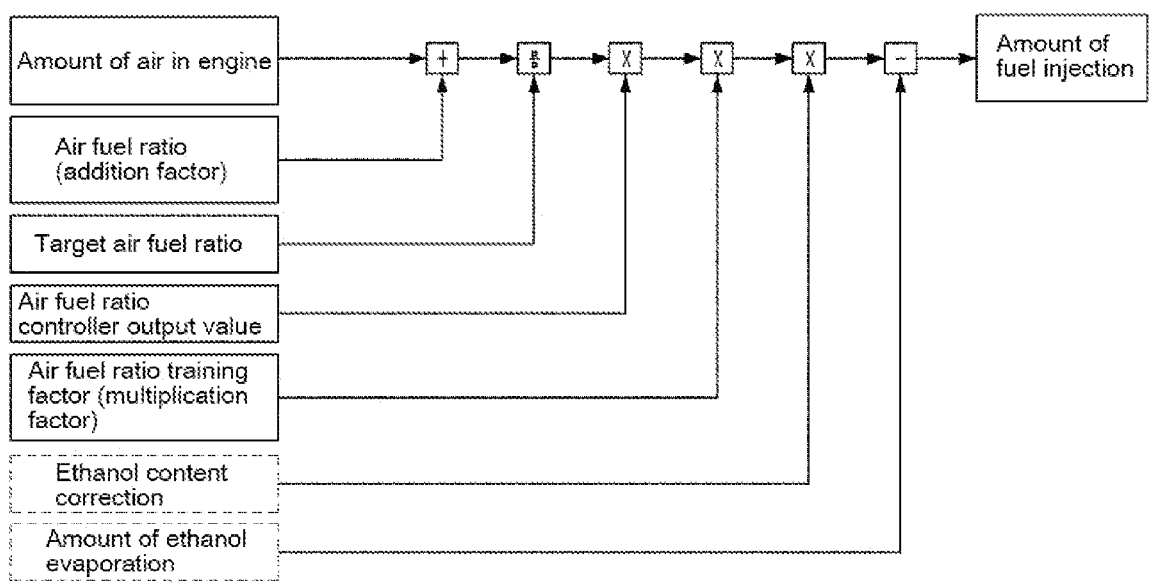
FIG. 3 is a diagram showing a process of deriving the amount of fuel injection in a fuel injection control system according to an embodiment of the present invention.

FIG. 1 shows a system configuration of the fuel injection system of a flex-fuel vehicle (FFV) according to an aspect of the present invention. FIG. 2 is a graph showing a change in the fuel injection correction value according to a change of ethanol content. FIG. 3 is a diagram showing a process of deriving the amount of fuel injection in a fuel injection control system according to an embodiment of the present invention.

Referring to FIGS. 1 to 3, the FFV uses blending fuel in which a given amount of ethanol has been mixed with gasoline as fuel. The FFV can minimize noxious gas emissions through combustion corresponding to a theoretical air fuel ratio only when more fuel is injected compared to a case where only gasoline is used as fuel as ethanol content is increased as in FIG. 2.

As in the example of FIG. 3, the amount of fuel injection in the FFV may be calculated in such a way as to multiply the amount of fuel injection, derived by the existing equation for calculating the amount of fuel injection (i.e., a method of dividing a value, calculated by adding an air fuel ratio training value to the amount of air of an engine, by a target air fuel ratio and multiplying an air fuel ratio controller output value and the air fuel ratio training value), by a correction value according to ethanol content and subtracting the amount of ethanol evaporation from the results.

As described above, the FFV can burn gasoline/ethanol blending fuel in the same engine. In this case, an air fuel ratio of gasoline is 14.7, whereas an air fuel ratio of ethanol is 9. An octane number of gasoline is 92, whereas an octane number of ethanol is 111. Accordingly, it is very important to check accurate content of ethanol within blending fuel because gasoline and ethanol are different in major characteristics as described above.

The reason for this is that if the ethanol content of blending fuel is checked to be lower than actual content, it is inefficient because spark advance available in ethanol is not sufficiently used and if the ethanol content of blending fuel is checked to be higher than actual content, engine damage may be caused because knocking, preignition, etc. occurs due to excessive spark advance.

Accordingly, a technology using an ethanol sensor capable of directly measuring ethanol content within fuel has been proposed. The fuel injection control system of an FFV according to an aspect of the present invention is based on a configuration including an ethanol sensor 20 in the middle of a fuel line, that is, a fuel rail that connects an injector 50 and a fuel pump 30, so that ethanol content within fuel can be directly measured.

The ethanol sensor 20 checks ethanol content within fuel that passes through the sensor in real time based on the fact that gasoline and ethanol have different electrical characteristics (e.g., dielectric constants). In this case, accurate and fast control can be performed compared to a previous technology for training ethanol content based on a value detected by an oxygen sensor 10 because an injection correction value is calculated based on an ethanol sensor value and immediately used for feedforward.

However, since the ethanol sensor 20 is commonly positioned in the middle of the fuel rail as in the example of FIG. 1, a point of time at which an ethanol content value is detected by the ethanol sensor and a point of time at which the detected content value is incorporated into actual injection are inevitably different depending on the position where the ethanol sensor 20 is positioned. An unwanted error occurs when feedforward is performed due to a difference between the points of time, so combustion stability may be deteriorated.

Accordingly, embodiments of the present invention are contrived to achieve the accuracy and rapidness of fuel injection control by incorporating a correction value, corresponding to a change in the content of ethanol, into an injection control value at a point of time at which fuel including ethanol whose content has been changed due to the supply of new oil is actually injected into a cylinder through feedforward into which an ethanol content change section between a point of time at which a change in the content of ethanol is detected and a point of time at which the detected content change is incorporated into actual injection has been considered.

Figure 4:
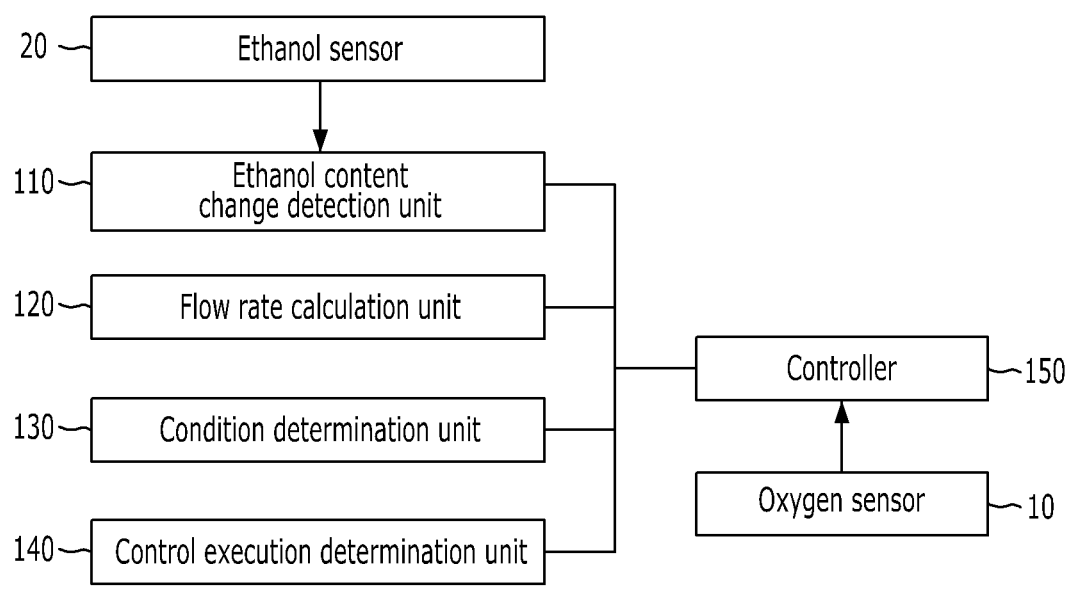
FIG. 4 is a schematic configuration of a fuel injection control system in an FFV according to an aspect of the present invention.

FIG. 4 is a schematic configuration of a fuel injection control system in an FFV according to an aspect of the present invention.

Referring to FIGS. 1 and 4, the fuel injection control system according to an aspect of the resent invention includes oxygen sensors 10 disposed on the upstream side and downstream side of a catalyst unit 60 in an exhaust line, respectively, with respect to the direction of flow of waste gas and an ethanol sensor 20 positioned in the middle of a fuel line connecting the injector 50 and the fuel pump 30, that is, a fuel rail, to measure ethanol content of blending fuel.

The oxygen sensor 10 measures oxygen-partial pressure within waste gas using an electric resistance method and transmits the measured value to a controller 150. The controller 150 determines a fuel excess when oxygen-partial pressure measured by the oxygen sensor 10 is higher than a reference value, and determines fuel insufficiency when the measured value is not higher than the reference value. Oxygen-partial pressure information within waste gas provided by the oxygen sensor 10 as described above is used as important information in fuel injection control.

The ethanol sensor 20 checks ethanol content within blending fuel in real time using the fact that ethanol and gasoline have different electrical characteristics, for example, dielectric constants, and provides important information in controlling the amount of fuel injection. The ethanol sensor 20 detects ethanol content within blending fuel in real time and provides the detected ethanol content information to an ethanol content change detection unit 110.

The ethanol content change detection unit 110 detects a change in the content of ethanol within blending fuel. Specifically, the ethanol content change detection unit 110 detects a change in the ethanol content within blending fuel in a measured value, that is, an ethanol content detection value, by monitoring information about ethanol content provided by the ethanol sensor 20 in real time. For example, when new fuel is supplied, the ethanol content change detection unit 110 detects a change in the content of ethanol based on a change in a value measured by the ethanol sensor 20.

When a change in the content of ethanol within blending fuel is detected by the ethanol content change detection unit 110, a flow rate calculation unit 120 performs a process of calculating a volumetric flow rate of the blending fuel injected into a cylinder and integrating the calculated value. A preliminary task necessary to check when content change ethanol will be actually incorporated into cylinder injection from a point of time at which a change in the content of ethanol was detected is performed.

The flow rate calculation unit 120 may include a process of calculating the volumetric flow rate based on information necessary to calculate a volumetric flow rate of blending fuel provided by sensors disposed in parts of a vehicle, and integrating the calculated value. In this case, the information necessary to calculate the volumetric flow rate of the blending fuel may include some or all of an injection temperature, injection pressure, a pressure difference between the cylinder and the fuel line, and the opening time of the injector.

Furthermore, when a change in the content of ethanol within the blending fuel is detected by the ethanol content change detection unit 110, a condition determination unit 130 determines whether a change in the content of ethanol detected by the ethanol content change detection unit 110 satisfies a condition for applying a fuel injection correction value. Furthermore, if the condition is satisfied, a control execution determination unit 140 determines whether to apply the fuel injection correction value based on the volumetric flow rate integration value of the flow rate calculation unit 120.

The condition in the condition determination unit 130 may be a situation in which the supply of new fuel is detected and thus a change in the ethanol content is expected. For example, the condition may be determined to be satisfied when a change in the content of ethanol is not attributable to a temporary and local change in the dielectric constant, but the ethanol content change exceeds a first reference value stored in a recording device, for example, memory, as the results of the monitoring of the ethanol content change by the ethanol content change detection unit 110.

The first reference value is a value derived through simulations or repeated experiments. A content change at a point of time at which a change in the content of ethanol starts to affect an output change or waste gas may be used as a reference value. Accordingly, when a change in the content of ethanol exceeds the first reference value, the condition determination unit 130 determines that the content change affects output or waste gas. A subsequent process is performed so that the content change is incorporated into fuel injection control.

If, as a result of the determination of the condition determination unit 130, the condition for applying the fuel injection correction value is not satisfied, that is, the first reference value stored in the memory is not exceeded, the condition determination unit 130 determines that a change in the content of ethanol does not greatly affect output or waste gas. The flow rate calculation unit 120 resets an integrated value calculated from a point of time at which a change in the content of ethanol was detected.

When the condition for applying the fuel injection correction value is satisfied, the control execution determination unit 140 determines whether to apply the fuel injection correction value by comparing the volumetric flow rate integration value of the flow rate calculation unit 120 with a preset reference value (i.e., a second reference value). The second reference value may be a fuel line volumetric flow rate in the section between the point at which the ethanol sensor 20 is disposed and the point at which blending fuel is injected, for example, the injector.

That is, the second reference value is a fuel volumetric flow rate in a content change modeling section S that may be defined from the point at which the ethanol sensor 20 is positioned to the point at which blending fuel is injected. The second reference value may be the results derived through calculation using the fuel line volume, line pressure, and temperature of the corresponding section (i.e., between the ethanol sensor 20 and the injector 50) as variables or may be the results derived through simulation experiments or previous simulations.

For this reason, if, as a result of a comparison between the volumetric flow rate integration value and the second reference value, the volumetric flow rate integration value is the second reference value or less, it may be considered that fuel whose ethanol content has changed has not yet been incorporated into actual fuel injection because fuel whose ethanol content has changed passes through the content change modeling section. When the second reference value is exceeded, it may be considered that fuel whose ethanol content has changed starts to be incorporated into actual fuel injection from a point of time at which the second reference value is exceeded.

Accordingly, when the integrated value is equal to or smaller than the second reference value stored in the memory, the control execution determination unit 140 determines that fuel whose ethanol content has changed has not yet been incorporated into actual fuel injection, and repeats a process of integrating a calculated volumetric flow rate value with a previous value. The control execution determination unit 140 determines that fuel whose ethanol content has changed has been incorporated into actual fuel injection from a point of time at which the integrated value exceeds the second reference value, and generates a control execution signal for applying the fuel injection correction value.

The fuel injection control system according to an aspect of the present invention includes the controller 150 configured to perform control to apply a fuel injection correction value. The controller 150 receives a control execution signal from the control execution determination unit 140 and performs given control for adjusting the amount of fuel injection. For example, the controller 150 determines a fuel injection correction value corresponding to a change in the content of ethanol and adjusts the amount of fuel injection by incorporating the determined correction value.

The fuel injection correction value may be determined by a method of using a fuel injection map in which fuel injection data for each change section according to a change in the content of ethanol and a coolant temperature change has been stored or may be continuously applied through a specific excess section model. This may be experimentally modeled. For example, the fuel injection correction value may be modeled through a primary filter having a time constant dependent on a change time of ethanol content detected by the ethanol sensor.

In addition, all of methods that may be practically derived, including a method of automatically calculating and outputting the best correction value when ethanol content and a coolant temperature are received by applying an algorithm for deriving a given relation equation between a change in the content of ethanol and a coolant temperature change and the amount of fuel injection through repeated experiments or simulations and including the derived relation equation, may be taken into consideration.

Hereinafter a fuel injection control process performed by the fuel injection control system of an FFV is described.

Figure 5:
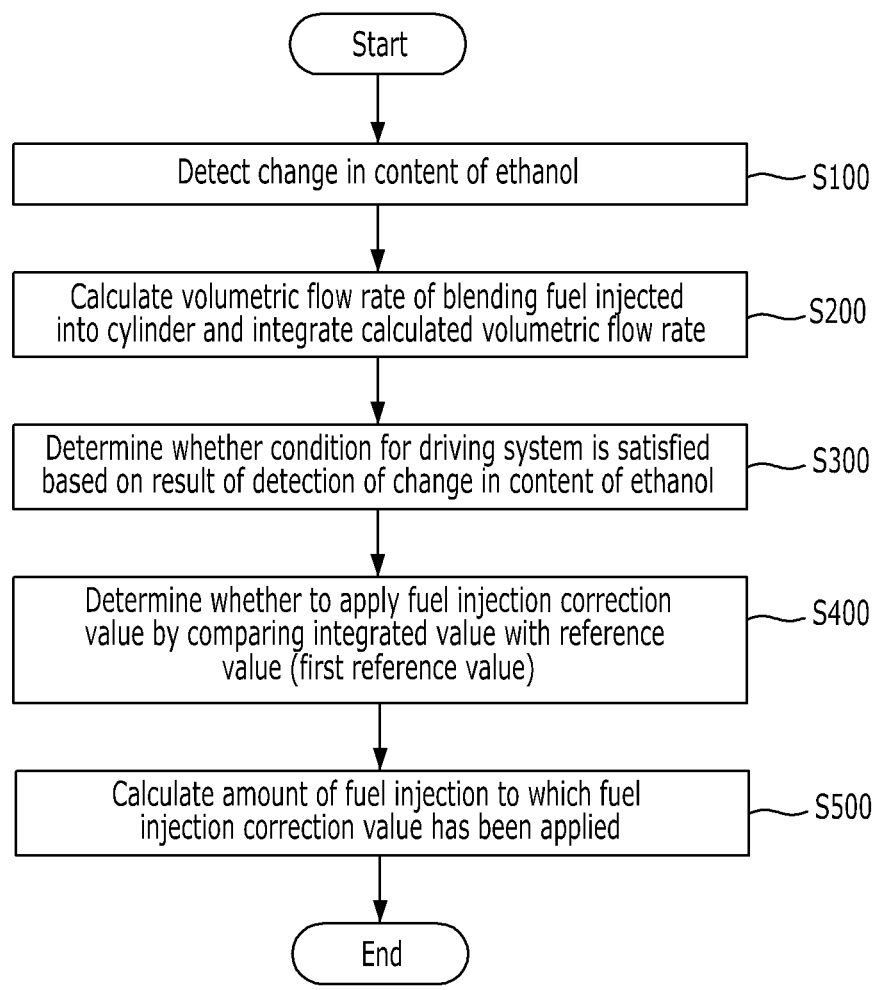
FIG. 5 is a schematic control flowchart for fuel injection control in an FFV according to another aspect of the present invention.
Figure 6:
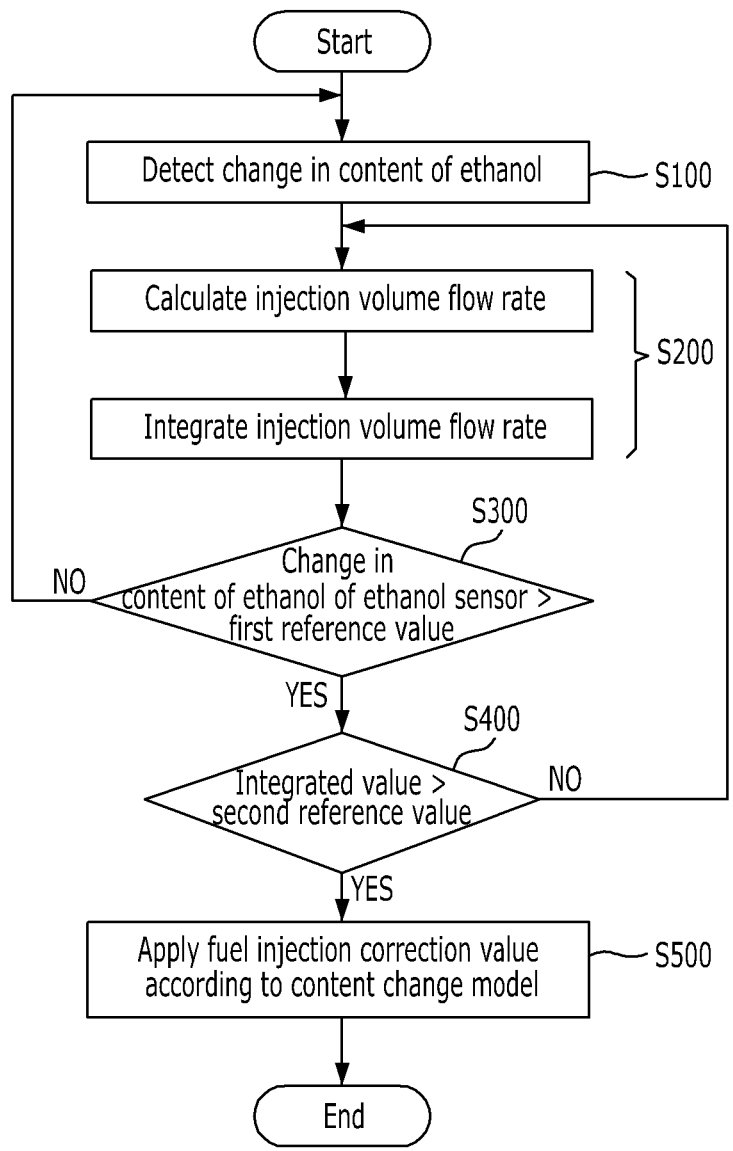
FIG. 6 is a flowchart including a detailed control algorithm for fuel injection control in an FFV.

FIG. 5 is a schematic control flowchart for fuel injection control in an FFV according to another aspect of the present invention. FIG. 6 is a flowchart including a detailed control algorithm for fuel injection control in an FFV.

Referring to FIGS. 5 and 6, the control method according to an embodiment of the present invention includes a first step S100 of detecting a change in the content of ethanol, a second step S200 of calculating a volumetric flow rate of blending fuel and integrating the calculated value, a third step S300 of determining whether a condition is satisfied based on a result of the detection of the change in the content of ethanol in the first step, a fourth step S400 of determining whether to apply a fuel injection correction value and calculating the amount of fuel injection by applying the correction value based on a result of the determination, and a fifth step S500.

In the first step S100, a change in the content of ethanol within blending fuel is detected in a change in the measured value of the ethanol sensor. Specifically, information about ethanol content provided by the ethanol sensor is monitored in real time. Whether there is a change in the content of ethanol within the blending fuel is determined by comparing the monitored information with a previous measured value.

In the second step S200, when a change in the content of ethanol is detected in the first step S100, a volumetric flow rate of the blending fuel injected into the cylinder is calculated and the calculated value is integrated. For example, a volumetric flow rate of blending fuel injected into the cylinder is calculated based on information necessary to calculate a volumetric flow rate of blending fuel provided by sensors disposed in parts of a vehicle. The calculated value is integrated.

In this case, the information necessary to calculate the volumetric flow rate of the blending fuel may include some or all of an injection temperature, injection pressure, the difference in the pressure between the cylinder and the fuel line, and the opening time of the injector.

In the third step S300, whether a change in the content of ethanol detected in the first step S100 satisfies the condition for applying a fuel injection correction value is determined. In the third step S300, for example, the condition may be determined to be satisfied when a change in the content of ethanol exceeds a preset first reference value. The first reference value may be a change in the content of ethanol at a point of time at which a change in the content of ethanol affects output or waste gas.

In the fourth step S400, when the condition in the third step S300 is satisfied, whether to apply a fuel injection correction value is determined by comparing the volumetric flow rate integration value in the second step S200 with a preset second reference value. In this case, the second reference value may be a fuel line volumetric flow rate in an excess section between the point at which the ethanol sensor is positioned and the point at which blending fuel is substantially injected into the cylinder, for example, the injector.

That is, the second reference value is a fuel volumetric flow rate in the content change modeling section that may be defined from the point at which the ethanol sensor is positioned to the point at which blending fuel is injected. The second reference value may be the results derived through calculation using the fuel line volume, line pressure, and temperature of the corresponding section (i.e., between the ethanol sensor and the injector) or may be the results derived through simulation experiments or previous simulations.

If, a result of a comparison between the volumetric flow rate integration value and the second reference value, the volumetric flow rate integration value is the second reference value or less, it may be considered that fuel whose ethanol content has changed has not yet been incorporated into actual fuel injection because fuel whose ethanol content has changed passes through the content change modeling section. When the second reference value is exceeded, it may be considered that fuel whose ethanol content has changed starts to be incorporated into actual fuel injection from a point of time at which the second reference value is exceeded.

Accordingly, when the integrated value is equal to or smaller than the second reference value stored in the memory, it is determined that fuel whose ethanol content has changed has not yet been incorporated into actual fuel injection, and a process of integrating the calculated volumetric flow rate value with a previous value is repeated. It is determined that fuel whose ethanol content has changed has been incorporated into actual fuel injection from a point of time at which the integrated value exceeds the second reference value. A next step for applying the fuel injection correction value is performed.

Finally, in the fifth step S500, if, as a result of the determination in the fourth step S400, it is determined that the fuel injection correction value needs to be applied, a fuel injection correction value corresponding to a change in the content of fuel injection ethanol is determined. Furthermore, the amount of fuel injection is adjusted by incorporating the determined fuel injection correction value into a fuel injection value.

As described above, a method of using the fuel injection map or a method of applying a primary filter having a time constant dependent on a change time of ethanol content detected by the ethanol sensor may be taken into consideration in the fuel injection correction value.

In addition, all of methods that may be practically derived, including a method of automatically calculating and outputting the best correction value when ethanol content and a coolant temperature are received by applying an algorithm for deriving a given relation equation between a change in the content of ethanol and a coolant temperature change and the amount of fuel injection through repeated experiments or simulations and including the derived relation equation, may be taken into consideration.

An error occurring in the content change modeling section until a fuel injection correction value is incorporated, that is, from the point at which a change in the content of ethanol is detected to the point at which fuel whose ethanol content has changed reaches the injector (i.e., a section between the point at which the ethanol sensor is positioned to the point at which fuel is injected), can be compensated for through feedback control using the oxygen sensor as in a conventional technology. The bandwidth of a feedback controller for the section may be differently applied depending on a degree of a content change.

In accordance with the system and method for controlling fuel injection in an FFV according to the embodiments of the present invention, fuel injection can be controlled by incorporating a correction value, corresponding to a change in the content of ethanol at a point of time which fuel whose ethanol content has changed is actually injected into the cylinder, into a fuel control value through feedforward in which the ethanol content change section (i.e., transient section) between a point of time at which a change in the content of ethanol is detected and a point of time at which the detected content change is incorporated into actual injection is considered.

Accordingly, although a change in the content of ethanol occurs due to the supply of new fuel, fuel injection can be performed with the best amount of injection at the best point of time in response to a change in the content of ethanol. That is, combustion stability can be maximized because the occurrence of an error of a fuel injection control value according to a change in the content of ethanol can be minimized. Accuracy and rapidness of control can be increased based on a value detected by the ethanol sensor.

In the detailed description of the present invention, only some special embodiments of the present invention have been described. It is however to be understood that the present invention is not limited to the special embodiments described in the detailed description, but should be construed as including all of changes, equivalents and substitutes without departing from the spirit and range of the present invention defined by the appended claims.

What is claimed is:

1. A system for controlling fuel injection in response to a change in a content of ethanol in a flex-fuel vehicle (FFV) having oxygen sensors and an ethanol sensor for measuring ethanol content of blending fuel, the system comprising:
   an ethanol content change detection unit configured to detect a change in a content of ethanol within blending fuel based on a change in a measured value of the ethanol sensor;
   a flow rate calculation unit configured to calculate a volumetric flow rate of blending fuel injected into a cylinder and to integrate the calculated value when a change in the content of ethanol within the blending fuel is detected by the ethanol content change detection unit;
   a condition determination unit configured to determine whether the change in the content of ethanol detected by the ethanol content change detection unit satisfies a condition for applying a fuel injection correction value;
   a control execution determination unit configured to determine whether to apply the fuel injection correction value by comparing the volumetric flow rate integration value of the flow rate calculation unit with a preset second reference value when the condition for applying the fuel injection correction value is satisfied; and
   a controller configured to determine a fuel injection correction value corresponding to a change in the content of ethanol and to adjust an amount of fuel injection by incorporating the determined fuel injection correction value.

2. The system of claim 1, wherein the condition determination unit determines the condition to be satisfied when the change in the content of ethanol exceeds a first reference value stored in memory.

3. The system of claim 1, wherein the flow rate calculation unit calculates the volumetric flow rate injected into the cylinder based on information necessary to calculate a volumetric flow rate of blending fuel provided by a sensor positioned in each part of a vehicle and integrates the calculated values.

4. The system of claim 3, wherein the information necessary to calculate the volumetric flow rate of the blending fuel comprises some or all of an injection temperature, injection pressure, a difference in a pressure between the cylinder and a fuel line, and an opening time of an injector.

5. The system of claim 1, wherein:
   when the volumetric flow rate integration value is equal to or smaller than the second reference value stored in memory, the control execution determination unit determines that fuel comprising changed ethanol content has not yet been incorporated into actual fuel injection and repeats a process of integrating the calculated volumetric flow rate value with a previous value, and
   when the volumetric flow rate integration value exceeds the second reference value, the control execution determination unit determines that fuel comprising changed ethanol content has been incorporated into actual fuel injection and generates a control execution signal for applying the fuel injection correction value.

6. The system of claim 5, wherein the second reference value comprises results derived through calculation using a fuel line volume, line pressure, and a temperature in a content change modeling section, defined as a section from a point at which the ethanol sensor is positioned to a point at which blending fuel is injected, as variables or results derived through simulation experiments or previous simulations.

7. The system of claim 1, wherein the fuel injection correction value is derived through a fuel injection map in which fuel injection data for each change section according to ethanol content and a coolant temperature change has been stored.

8. A method of controlling fuel injection in response to a change in a content of ethanol in a flex-fuel vehicle (FFV) having oxygen sensors and an ethanol sensor for measuring ethanol content of blending fuel, the method comprising:
- a first step of detecting a change in a content of ethanol within blending fuel based on a change in a measured value of the ethanol sensor;
- a second step of calculating a volumetric flow rate of blending fuel injected into a cylinder and integrating the calculated value when a change in the content of ethanol within the blending fuel is detected in the first step;
- a third step of determining whether the change in the content of ethanol detected in the first step satisfies a condition for applying a fuel injection correction value;
- a fourth step of determining whether to apply the fuel injection correction value by comparing the volumetric flow rate integration value in the second step with a preset second reference value when the condition for applying the fuel injection correction value is satisfied in the third step; and
- a fifth step of determining a fuel injection correction value corresponding to a change in the content of ethanol if it is determined that the fuel injection correction value needs to be applied in the fourth step and adjusting an amount of fuel injection by incorporating the determined fuel injection correction value.

9. The method of claim 8, wherein the second step comprises:
calculating the volumetric flow rate injected into the cylinder based on information necessary to calculate a volumetric flow rate of blending fuel provided by a sensor positioned in each part of a vehicle, and integrating the calculated values.

10. The method of claim 9, wherein the information necessary to calculate the volumetric flow rate of the blending fuel comprises some or all of an injection temperature, injection pressure, a difference in a pressure between the cylinder and a fuel line, and an opening time of an injector.

11. The method of claim 8, wherein the third step comprises determining the condition to be satisfied when the change in the content of ethanol exceeds a first reference value stored in memory.

12. The method of claim 8, wherein in the fourth step,
when the volumetric flow rate integration value is equal to or smaller than the second reference value stored in memory, fuel comprising changed ethanol content is determined to have not yet been incorporated into actual fuel injection and a process of integrating the calculated volumetric flow rate value with a previous value is repeated, and when the volumetric flow rate integration value exceeds the second reference value, fuel comprising changed ethanol content is determined to have been incorporated into actual fuel injection and a control execution signal for applying the fuel injection correction value is generated.

13. The method of claim 12, wherein the second reference value comprises results derived through calculation using a fuel line volume, line pressure, and a temperature in a content change modeling section, defined as a section from a point at which the ethanol sensor is positioned to a point at which blending fuel is injected, as variables or results derived through simulation experiments or previous simulations.

14. The method of claim 8, wherein the fuel injection correction value in the fifth step is a value derived through a fuel injection map in which fuel injection data for each change section according to ethanol content and a coolant temperature change has been stored or a value modeled through a primary filter having a time constant dependent on a change time of ethanol content.

* * * * *